(12) United States Patent
Simper et al.

(10) Patent No.: US 11,502,755 B2
(45) Date of Patent: Nov. 15, 2022

(54) SYSTEM FOR CREATING AN ADJUSTABLE DELAY

(71) Applicant: Rohde & Schwarz GmbH & Co. KG, Munich (DE)

(72) Inventors: Benedikt Simper, Munich (DE); Martin Vossiek, Munich (DE); Christian Carlowitz, Munich (DE); Peter Tschapek, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/214,561

(22) Filed: Mar. 26, 2021

(65) Prior Publication Data

US 2022/0311518 A1   Sep. 29, 2022

(51) Int. Cl.
*H04B 10/50* (2013.01)
*G01S 7/497* (2006.01)
*H04B 10/40* (2013.01)
*H04B 10/43* (2013.01)

(52) U.S. Cl.
CPC .............. *H04B 10/50* (2013.01); *G01S 7/497* (2013.01); *H04B 10/40* (2013.01); *H04B 10/43* (2013.01)

(58) Field of Classification Search
None
See application file for complete search history.

(56) References Cited

U.S. PATENT DOCUMENTS

| | | | | |
|---|---|---|---|---|
| 5,825,464 A | * | 10/1998 | Feichtner | G01S 7/4818 356/4.02 |
| 6,118,566 A | * | 9/2000 | Price | H04B 10/2507 398/1 |
| 2002/0109906 A1 | * | 8/2002 | Grubb | H04B 10/2935 359/334 |
| 2003/0035204 A1 | * | 2/2003 | Ahn | H01S 3/06758 359/341.3 |
| 2004/0234262 A1 | * | 11/2004 | Bortz | H04J 14/0221 398/45 |
| 2013/0166113 A1 | * | 6/2013 | Dakin | G01P 13/025 356/28 |
| 2016/0057517 A1 | * | 2/2016 | Coca | H04Q 11/0005 398/45 |
| 2017/0329010 A1 | * | 11/2017 | Warke | G01S 17/10 |

* cited by examiner

*Primary Examiner* — Darren E Wolf
(74) *Attorney, Agent, or Firm* — Christensen O'Connor Johnson Kindness PLLC

(57) ABSTRACT

A system for creating an adjustable delay in an optical signal. The system has an input interface for receiving an optical input signal. The system has a first optical modulator configured to shift the frequency of the optical input signal depending on a setting of the first optical modulator, thereby generating a modulated optical signal. The system includes at least two frequency selective reflectors configured to reflect the modulated optical signal, thereby providing a reflected signal. The system has a control circuit that adapts the setting of the first optical modulator such that a frequency shift of the optical input signal introduced by the first optical modulator is set by the control circuit. The frequency shift introduced by the first optical modulator corresponds to an operational frequency of one of the at least two frequency selective reflectors associated with the setting of the first optical modulator. The system has an output fiber that receives the reflected signal from the corresponding frequency selective reflector.

17 Claims, 3 Drawing Sheets

SYSTEM FOR CREATING AN ADJUSTABLE DELAY

FIELD OF THE DISCLOSURE

Embodiments of the present disclosure generally relate to a system for creating an adjustable delay in an optical signal for providing a response to an optical system, for instance a light detection and ranging system (LiDAR system).

BACKGROUND

LiDAR systems such as LiDAR sensors become more and more popular in different applications, particularly in the automotive sector due to autonomous driving, also called self-driving vehicles. Since the LiDAR systems become more and more popular in different technical fields, it is also necessary to validate and compare the different LiDAR systems concerning their respective characteristics. For vehicle-in-the-loop tests of a self-driving vehicle equipped with at least one LiDAR system, a LiDAR target simulator is necessary in order to validate the respective LiDAR system.

Typically, the target simulator simulates a certain target scenario, also called scenery, for validating the LiDAR system to be tested, thereby generating a response signal to the LiDAR system, namely a response signal to a signal outputted by the LiDAR system. Depending on the target scenario applied, at least one target with respective characteristics is simulated, wherein the characteristics are associated with the response signal.

Generally, the target simulator receives an optical signal transmitted by the LiDAR system and responds with a delayed signal that shall represent a reflected signal of a target or rather obstacle according to the target scenario applied. The delay in time represents the distance of the target or rather obstacle with respect to the LiDAR system under test.

In the state of the art, LiDAR target simulators are known that sample the signal provided by the LiDAR system by a sensor. Then, the LiDAR target simulators generate the delayed signal in accordance with the target scenario applied. Hence, the delayed signal is generated internally based on settings associated with the target or rather obstacle of the respective target scenario applied. The delayed signal is outputted as a return signal that has certain characteristics associated with the target or rather obstacle of the respective target scenario applied. In other words, the LiDAR target simulator, also called LiDAR echo system, acquires the signal outputted by the LiDAR system, e.g., the pulse of the LiDAR system, and sends back a delayed version, which is synthesized using a laser-based signal generator. The LiDAR target simulator only supports a response for an incoherent LiDAR concept. Additionally, the optical center frequency of the target simulator is not coupled with the LiDAR system, which requires precise adjustment efforts to guarantee sufficient overlap.

However, for complex signal forms/patterns or rather frequency-modulated continuous wave (FMCW) signals, it is very challenging to sample the respective signal and to generate the corresponding delayed signal.

Accordingly, there is need for a simple and cost-efficient way to create a delay in an optical signal received for providing a response to an optical signal that outputs the optical signal. Moreover, the respective delay introduced in the optical signal has to be adjustable in order to ensure that the system may be used for testing the optical system, e.g., the LiDAR system, with respect to different (target) scenarios.

SUMMARY

Embodiments of the present disclosure provide a system for creating an adjustable delay in an optical signal for providing a response to an optical system, for instance a LiDAR system. In an embodiment, the system comprises an input interface for receiving an optical input signal, for example an optical input signal provided by the optical system to be tested, namely the LiDAR system. The system further comprises a first optical modulator associated with the input interface. The first optical modulator is configured to shift the frequency of the optical input signal received depending on a setting of the first optical modulator, thereby generating a modulated optical signal. Moreover, the system comprises at least two frequency selective reflectors that are configured to reflect the modulated optical signal, thereby providing a reflected signal. In addition, the system has a control circuit or module connected with the first optical modulator. The control module is configured to adapt the setting of the first optical modulator such that a frequency shift of the optical input signal introduced by the first optical modulator is set by the control module. The frequency shift introduced by the first optical modulator corresponds to an operational frequency of one of the at least two frequency selective reflectors associated with the setting of the first optical modulator. In addition, the system comprises an output fiber associated with the at least two frequency selective reflectors. The output fiber receives the reflected signal from the corresponding frequency selective reflector.

Further, embodiments of the present disclosure provide a system for creating an adjustable delay in an optical signal for providing a response to an optical system. In an embodiment, the system comprises an input interface for receiving an optical input signal. The system comprises at least two fiber delay lines with different lengths, which are associated with the input interface. The system also has at least one optical switch associated with the input interface and the at least two fiber delay lines. The at least one optical switch is configured to direct the optical input signal received at the input interface to at least one of the at least two fiber delay lines depending on a setting of the optical switch. Moreover, the system includes a control circuit or module connected with the at least one optical switch. The control module is configured to adapt the setting of the optical switch.

In general, the system can be used independently of the signal form of the optical input signal, e.g., the signal form the optical system, namely the LiDAR system to be tested, as the respective delay is purely done in the optical (frequency) domain of the signal processed by the system. In other words, the optical input signal is not sampled by the system, as the optical input signal is processed in the optical domain. The respective delay is introduced depending on the setting of the first optical modulator, as the delay in time of the reflected signal is associated with the frequency shift introduced by the first optical modulator. The respective frequency shift introduced determines which one of the at least two frequency selective reflectors is used for reflecting the modulated optical signal, as the frequency may be shifted to the operational frequency of a dedicated frequency selective reflector. The dedicated frequency selective reflector of the at least two frequency selective reflectors is located at a certain position that is associated with the delay in time. Thus, the operational frequency of the frequency selective reflector corresponds to the frequency of the signal that is reflected by the respective frequency selective reflector.

In other words, the frequency selective reflectors, for instance Fiber Bragg Gratings (FBGs), are located at specific distances associated with different delays in time. The modulated optical signal outputted by the first optical modulator is reflected by a dedicated of the at least two, for example several, frequency selective reflectors, wherein the dedicated frequency selective reflector corresponds to the distance of a target to be simulated according to the target scenario applied.

Generally, the system according to the present disclosure adopts a fiber optical delay line, as the optical input signal received via the input interface is modulated by the first optical modulator such that the modulated optical signal is reflected by the dedicated one of the at least two frequency selective reflectors. The modulation introduced by the first optical modulator is controlled by the control module that sets the first optical modulator accordingly such that the frequency of the optical input signal is shifted depending on the setting of the first optical modulator controlled appropriately. The frequency shift introduced is characteristic for the target scenario applied, e.g., the at least one target simulated, as the frequency shift determines which one of the at least two frequency selective reflectors becomes active or rather reflects the modulated optical signal. The selection of the frequency selective reflector used for reflecting the modulated optical signal has an influence on the delay introduced in the signal processed by the system since the reflected signal is delayed with respect to the optical input signal differently. As mentioned above, this depends on the location of the dedicated frequency selective reflector, namely the frequency shift introduced by the first optical modulator. Afterwards, the reflected signal is forwarded to the output fiber such that the reflected signal can be forwarded to the optical system such that it is used for testing the optical system, for example the LiDAR system.

In some embodiments, the optical modulator may be established by a Mach Zehnder Modulator (MZM).

Furthermore, switching between different signal delays can be done electronically and very fast, thereby generating various delays in order to simulate a respective target scenario. The at least two fiber delay lines may each have a first end associated with the at least one optical switch located between the at least two fiber delay lines and the input interface. Further, the at least two fiber delay lines each have a second end opposite to the respective first end, whereas the delayed signal is outputted at the respective second ends. The second ends may be associated with the output fiber, for example via a second optical switch, thereby ensuring a common output established by the output fiber.

Generally, the optical input signal relates to a pulse. Put differently, the optical input signal has a pulse form. However, the optical input signal may also relate to a continuous frequency modulated continuous wave (FMCW) sweep.

Moreover, a purely optical signal manipulation for optical systems such as LiDAR systems is used with fast electro-optic modulation, which allows coherent response signals at the same wavelength as well as direction-dependent signal delay for scanning optical systems to emulate a three-dimensional scenery in real-time.

Thus, coherent optical systems, e.g., coherent LiDAR systems, with fast target switching can be tested. Moreover, the respective shape of the signal of the optical system, e.g., the LiDAR system, is preserved, but the signal, for example its respective shape, can be manipulated precisely.

An aspect provides that the control module is further configured to control the first optical modulator and/or the first optical switch based on a distance of the target to be emulated, wherein the distance of the target to be emulated is set by a user depending on the target scenario applied. The user may select a certain target scenario that is used for testing the optical system, for example the LiDAR system. Depending on the target scenario selected, the control module controls the first optical modulator and/or the first optical switch differently, thereby ensuring that the optical input signal is shifted differently with regard to its frequency, thereby generating a differently modulated optical signal that is delayed differently.

The different delay may be introduced while reflecting the respective signal by a different frequency selective reflector. This means that the user may select a first target scenario that comes along with a first setting of the optical modulator such that a first frequency shift is introduced by the first optical modulator, thereby ensuring that the modulated optical signal is reflected by the first of the at least two frequency selective reflectors. Alternatively, a second target scenario may be selected by the user such that a second setting of the first optical modulator is applied, resulting in a second frequency shift of the optical input signal, thereby generating a differently modulated optical signal that is reflected by the second of the at least two frequency selective reflectors. Therefore, the delay introduced by the system is different due to the different target scenario applied, namely due to the different frequency shift introduced by the first optical modulator.

Alternatively, the different delay is introduced by the different length of the fiber delay line connected to the input interface via the optical switch that is controlled by the control module accordingly.

Another aspect provides that this system comprises an output interface associated with an output fiber. The output interface receives the reflected signal or rather the delayed signal. The output interface may be associated with the optical system to be tested by the system, namely the LiDAR system to be tested. The LiDAR system may receive the reflected signal via the output interface of the system, thereby ensuring that the characteristics of the optical system, namely the LiDAR system, can be evaluated appropriately.

The system may comprise a second optical modulator that is associated with the output fiber. The second optical modulator may further modulate the reflected signal prior to forwarding the reflected signal to the output interface, thereby providing a modulated reflected signal. Accordingly, the modulated reflected signal is generated by the second optical modulator that processes the reflected signal.

The control module may be connected with the second optical modulator such that a frequency shift of the reflected signal introduced by the second optical modulator is set by the control module. Again, the control module may control the second optical modulator depending on a certain target scenario applied that has been selected by the user of the system previously. Hence, an intended frequency shift with respect to the optical input signal may be introduced intentionally.

The second optical modulator may be configured to shift the frequency of the reflected signal to a desired response frequency. Therefore, the user may select via the respective target scenario the desired response frequency of the delayed signal that is used for testing the optical system. The second optical modulator ensures that the desired frequency of the response signal is achieved, namely the modulated reflected signal.

Again, the second optical modulator in some embodiments may also be established by a Mach Zehnder modulator (MZM).

Generally, the second optical modulator may be configured to provide a Doppler shift of the reflected signal with respect to the optical input signal. Therefore, different target scenarios may be simulated by the system, e.g., different velocities of the target simulated, namely an approaching target or rather a departing target with respect to the optical system under test, namely the LiDAR system. Thus, different scenarios can be simulated appropriately.

A further aspect provides that the control module comprises a signal generator that outputs a control signal used for controlling the optical modulator. The control signal may be used for frequency shifting the respective signal processed by the respective optical modulator, namely the first optical modulator or rather the second optical modulator. Thus, the control module may comprise at least two different signal generators or rather a single signal generator configured to output two different control signals that are processed by the different optical modulators accordingly.

In general, the respective optical modulator shifts the frequency of the optical input signal, namely the signal of the LiDAR system, by processing the control signal received from the signal generator.

The respective optical modulator receives the optical input signal, namely the signal of the LiDAR system, as well as the control signal provided by the signal generator, thereby shifting the frequency of the optical input signal accordingly, namely the frequency of the signal of the LiDAR system.

The at least two frequency selective reflectors may be associated with a fiber. Thus, the at least two frequency selective reflectors may be located within a fiber, e.g., an optical fiber. As mentioned above, the frequency selective reflectors may be established by Fiber Bragg Gratings (FBGs) at specific distances within the fiber. Therefore, reflection of the modulated optical signal takes place at a specific distance associated with the dedicated frequency selective reflector that is responsive to the frequency of the modulated optical signal due to the frequency shift introduced by the first optical modulator.

Furthermore, the system may comprise a position sensor that is configured to determine the direction of the optical input signal. The position sensor may be associated with a screen such that impinging information of the optical input signal on the screen may be gathered by the position sensor.

The position sensor may relate to a position sensitive detector, a detector array and/or an angle of arrival sensor. In some embodiments, the position sensor may relate to a two-dimensional detector array such that a certain plane is provided that can be used for determining the location of the impinging optical input signal. The angle of arrival sensor detects the impinging angle of the optical input signal emitted by the optical system to be tested, namely the LiDAR system. For this purpose, the angle of arrival sensor may comprise several (optical) sensors, for instance three sensors, which allow to determine the angle of arrival of the optical input signal emitted by the optical system to be tested.

The position sensitive detector (PSD), also called position sensitive device, corresponds to an optical position sensor that can measure a position of a light spot in one or two dimensions on a (sensor) surface, for instance a screen. The respective components can be used for determining the location of a light beam impinging on the screen, namely the light beam associated with the optical input signal. The position sensitive detector (PSD) may detect the location of the light beam with an infinite resolution.

The system may further comprise an amplitude modifier that is associated with the output fiber. Therefore, the magnitude of the reflected signal may be modified accordingly, which depends on the respective target scenario applied that has been selected previously by the user. In other words, the reflected signal is adjusted in amplitude. Thus, a cross section adaption of the target simulated may be ensured by the amplitude modifier. In some embodiments, attenuation due to distance emulated and/or loss compensation of the system may be provided by the amplitude modifier.

Another aspect provides that the system comprises a first circulator and a second circulator that define terminals of the output fiber. The respective circulators relate to optical circulators that are used for forwarding the optical input signal and the modified optical signal as well as the reflected signal and the modified reflected signal.

The first optical modulator may be located between the first circulator and the second circulator. The optical input signal is forwarded via the first circulator to the first optical modulator, wherein the modulated optical signal provided by the first optical modulator is forwarded to the frequency selective reflectors via the second circulator.

In addition, the reflected signal provided by the dedicated frequency selective reflector is forwarded to the second optical modulator via the second circulator, wherein the modulated reflected signal provided by the second optical modulator is forwarded to the output interface via the first circulator.

Hence, the respective circulators forward the signals differently depending on their direction, namely towards the frequency selective reflectors or coming from the frequency selective reflectors.

In general, the system may comprise at least one directional coupler associated with the output fiber. The directional coupler may be used instead of the respective circulators. The directional coupler diverts the delayed signal, which may be frequency shifted back to its original center frequency by the second optical modulator, e.g., the second Mach Zehnder Modulator.

Further, the system may comprise at least two fiber delay lines with different lengths, which are associated with the input interface. The at least two different fiber delay lines may each have at least two different frequency selective reflectors, for example several frequency selective reflectors located at different distances within the fiber delay lines. The fiber delay lines may be used for a fine adjustment of the delay introduced, whereas the different frequency selective reflectors associated with the respective fiber may be used for a coarse delay adjustment.

In a certain embodiment, the system may comprise at least two fiber delay lines connected in series. These fiber delay lines may have different lengths. In some embodiments, the at least two fiber delay lines may be connected in a switched binary cascade. Depending on settings of switches of the switched binary cascade, the delay introduced can be varied in steps, for example in a controlled manner by the control module.

Generally, N+1 switches and N delay lines may be provided such that $2^N$ delays can be simulated.

In another embodiment, the at least two frequency selective reflectors and the at least two fiber delay lines with different lengths are interconnected in series. Hence, a coarse delay may be set by a frequency selective adjustment, namely the at least two frequency selective reflectors, and a fine adjustment can be achieved by different fiber lengths of the delay lines.

In addition, the system may comprise at least one optical switch that is associated with the input interface. The optical switch may be used for forwarding the optical input signal received via the input interface to a selected one of the fiber delay lines, for example depending on a controlling of the control module.

Further, the control module may be connected with the at least one optical switch. The control module is configured to adapt the setting of the optical switch, thereby ensuring that the optical input signal is forwarded to a dedicated fiber delay line of the at least two fiber delay lines. Accordingly, the fine adjustment of the delay may be done in a controlled manner by the optical switch selecting the respective fiber delay line.

For instance, the system may comprise at least two fiber delay lines with different lengths, which are associated with the input interface. The at least one optical switch is associated with the at least two fiber delay lines, wherein the at least optical switch is configured to direct the optical input signal received at the input interface to at least one of the at least two fiber delay lines depending on a setting of the optical switch. The setting of the optical switch is controlled by the control module that is connected with the optical switch, thereby ensuring a fine adjustment of the delay introduced in the optical signal.

The optical system may be a LiDAR system, wherein the system is a LiDAR target simulator that is configured to simulate a target for the LiDAR system. Therefore, the optical system to be tested, namely the LiDAR system, can be tested with regard to its characteristics as different targets can be simulated for the LiDAR system, for example depending on different target scenarios applied.

Hence, the present disclosure relates to a novel approach to realize a (LiDAR) target simulator based mostly on optic technologies, namely frequency selective reflectors integrated within a fiber and/or fibers with different lengths. The approach based on optic technologies enables replicating a scenario in front of the optical system to be tested, e.g., the LiDAR system, similarly to existing electronic target simulators for radar systems.

Most notably, the system according to the present disclosure allows direct manipulation of the LiDAR signal in the optical frequency domain and thus the system does not require converting the optical pulse to digital and back again like in conventional approaches.

In some embodiments, a frequency translation, e.g., by the optical modulators, is used for fast switching between different delays associated with the frequency selective reflectors, namely the Fiber Bragg Grid based (FBG-based) delays on the fiber. High frequency signals, e.g., up to at least 70 GHz is feasible, thereby enabling a large quantity of distance increments for a LiDAR bandwidth of approximately 1 GHz.

The frequency translation between the wavelength of the optical input signal, namely the one provided by the optical system, and the target simulator operating wavelength may be based on non-linear optical elements with the additional benefits of frequency drift compensation.

Generally, the optical input signal, namely the transmitted LiDAR signal (e.g., pulses), couples into a fiber by the input interface, e.g., a fiber coupler. The optical input signal is subjected to a scanning direction dependent delay. The optical input signal propagates back to the optical system, namely the LiDAR system, wherein the signal shape and phase are preserved. All delays are independent of the type of the optical input signal and, thus, compatible with coherent optical systems, such as FMCW LiDAR systems.

The optical input signal outputted by the LiDAR system, which may be a laser beam with very low divergence, sequentially scans a range of solid angles. For analysis purposes, the optical input signal is divided in two paths by a beam splitter. The first path is associated with direction estimation by a position sensor, namely an optical position sensor, or a lens and/or mirror for refocusing the optical input signal on a position sensitive photo detector. The second path is similarly focused, but the optical input signal is coupled into a fiber by the input interface. In order to simplify fiber coupling, e.g., axis alignment and divergence matching is challenging for single-mode fibers, a diffusor may be provided that guarantees a partial beam that matches the required alignment.

After coupling the optical input signal into the fiber by the input interface, the optical input signal is frequency shifted by the first optical modulator. Further realizations may employ a Mach Zehnder Modulator in order to shift the optical input signal to the frequency range of a certain position of a dedicated frequency selective reflector, e.g., a dedicated reflector on the delay line. With fast frequency switching, each solid angle scanned by the optical system experiences the desired delay such that a delay signal or rather a delayed response signal is provided.

Additionally, signal strength control allows modulating the emulated reflectivity of the target. Doppler effect emulation is feasible through frequency offsets. Since electronic signals provided by the control module drive all modulations, fast delay changes are achievable during LiDAR scanning Thus, the tested optical systems can experience variable scenery in real-time, which also enables resolution estimation in azimuth and elevation.

The delayed response signal is re-transmitted to the optical system under test. An amplitude modifier such as an amplifier may adapt signal power independently of the target emulated in order to compensate for any insertion loss of the system. Retransmission is achieved with a fiber coupler-based transition to free space propagation. For this purpose, the same coupler that is employed for acquisition can be reused if the retransmitted signal is coupled to the input path with an optical circulator. In other words, the input interface and the output interface may be established by the same component, namely the same fiber coupler associated with a circulator.

The diffusor in front of the fiber coupler guarantees a partial beam directed exactly into the incident direction. The optical system under test acquires the output signal and detects the emulated target accordingly.

Furthermore, additional optical frequency translation is desirable, e.g., for testing optical systems with a wavelength different from that of the target simulator.

This approach allows testing, e.g., a 905 nm LiDAR with a 1550 nm target simulator. Additional advantages include compensating thermal drifts that may lead to substantial wavelength shifts. For implementation, e.g., periodically-poled lithium niobate crystals (PPLN crystals) can be employed to perform difference frequency generation (DFG) with a 905 nm input and a 572 nm pump, resulting in a 1550 nm output signal. Reverse translation is feasible with the same pump leading to a 905 nm output.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In some embodiments, the term "module" refers to or includes, inter alia, a combination of hardware (e.g., a processor such as an integrated circuit or other circuitry) and software (e.g., machine- or processor-executable instructions, commands, or code such as firmware, programming, or object code). Furthermore, a combination of hardware and software may include hardware only (i.e., a hardware element with no software elements), software hosted at hardware (e.g., software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

Figure 1:
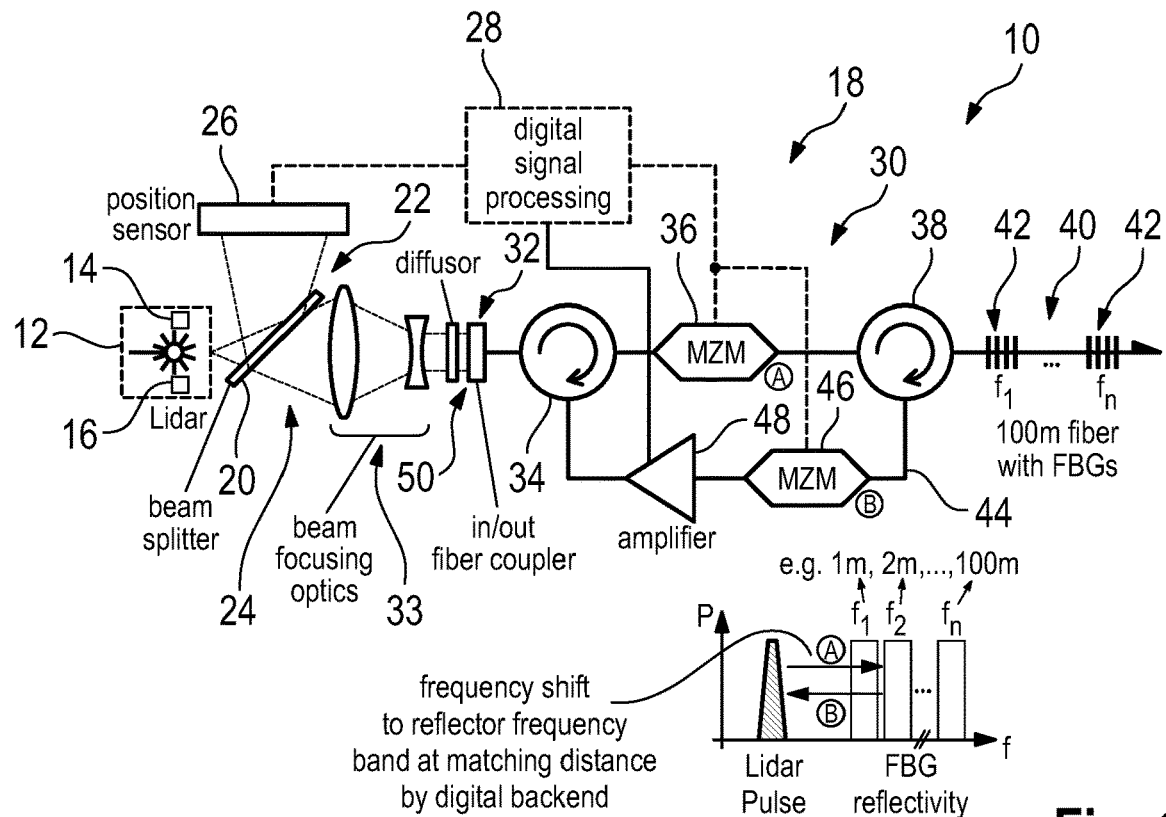
FIG. 1 schematically shows a system for creating an adjustable delay in an optical signal according to a first embodiment.

FIG. 1 schematically shows a system 10 for creating an adjustable delay in an optical signal. The system 10 interacts with an optical system 12 such as a LiDAR system. In the embodiment shown, the optical system 12 has a light emitting circuit or module 14 configured to output an optical signal, e.g., a light beam, as well a light receiving circuit or module 16 configured to receive an optical signal. The light emitting module 14 and the light receiving module 16 are integrated within a housing of the optical system 12.

Further, the system 10 comprises a LiDAR target simulator 18 that interacts with the optical system 12 in order to evaluate the characteristics of the optical system 12 while simulating a respective target scenario for the optical system 12. The LiDAR target simulator 18, e.g., the system 10, comprises a beam splitter 20 that splits the optical signal outputted by the optical system 12, e.g., the light beam, in a first part forwarded by a first path 22 and a second part forwarded by a second path 24. The target simulator 18 further comprises a position sensor 26 that is associated with the first path 22 as illustrated in FIG. 1.

The position sensor 26 is configured to determine the direction of the signal outputted by the optical system 12. For this purpose, the position sensor 26 can be associated with a screen such that impinging information of the signal outputted by the optical system 12 on the screen may be gathered by the position sensor 26. In general, the position sensor 26 is configured to determine the location of impinging light issued by the optical system 12, which may hit the screen or rather the beam splitter 20. In some embodiments, the screen may be partially transparent, thereby establishing the beam splitter 20.

Further, the position sensor 26 is connected with a control and/or analysis circuit or module 28 having a digital signal processing circuit for processing the information received, e.g., the information provided by the position sensor 26. Thus, the position sensor 26 forwards information concerning the respective location to the control and/or analysis module 28 for further processing. Thus, the position sensor 26 (together with the control and/or analysis module 28) maps the signal of the optical system 12 to a complex scene having different distances at different positions.

Moreover, the target simulator 18 has a response generation circuit or module 30 that is also connected with the control and/or analysis module 28 in a signal transmitting manner. The response generation module 30 is used for providing the delayed response.

The system 10 comprises an input interface 32 for receiving an optical input signal provided by the optical system 12, namely the signal outputted by the optical system 12. The input interface 32 is located behind optics 33, for example focusing optics and/or a diffusor. The focusing optics focuses the beam onto the diffusor that diffuses the light.

The input interface 32 is established by a fiber coupler that is directly connected with a fiber. The optical signal is coupled into the respective fiber. Hence, the diffused light is coupled into the optical fiber by the fiber coupler.

The signal outputted by the optical system 12, which is a laser beam with very low divergence, sequentially scans a range, also called field of view of the optical system 12, namely the LiDAR system. The signal outputted is divided in the two paths 22, 24 by the beam splitter 20, e.g., the partially transparent screen.

The first path 22 is used for determining/estimating the direction of the signal outputted by the optical system 12, as the first path 22 is associated with the position sensor 26. The second path 24 is similarly focused by the optics 33, but the split beam is coupled into the fiber by the input interface 32 established by the fiber coupler. The optics 33 comprise a diffusor that helps to simplify fiber coupling, namely axis alignment and divergence matching, thereby guaranteeing that the partial beam matches the required alignment.

In the fiber, a first circulator 34 is provided that processes the optical input signal accordingly such that the optical input signal is forwarded to a first optical modulator 36 established by, for example, a Mach Zehnder Modulator (MZM). The first optical modulator 36 is connected with the control and/or analysis module 28 such that the first optical modulator 36 is controlled by the control and/or analysis module 28.

Hence, the control and/or analysis module 28 sets the first optical modulator 36 such that the optical modulator 36 introduces a certain frequency shift depending on a setting of the first optical modulator 36 that is set by the control and/or analysis module 28 appropriately, for example depending on a target scenario applied.

Generally, the control and/or analysis module 28 comprises a signal generator having circuitry that generates or provides a control signal. The control signal is forwarded to the first optical modulator 36 in order to ensure that the frequency of the optical input signal is shifted appropriately by the first optical modulator 36.

Hence, the optical input signal, namely the LiDAR signal, is frequency shifted by the first optical modulator 36. The first optical modulator 36 generates a modulated optical signal that is forwarded to a second circulator 38.

The second circulator 38 processes the modulated optical signal such that it is forwarded to a fiber 40 having at least two frequency selective reflectors 42, for example several frequency selective reflectors 42. The frequency selective reflectors 42 may be established by Fiber Bragg Gratings (FBGs).

For instance, the fiber 40 has a length of 100 m such that several different frequency selective reflectors 42, namely Fiber Bragg Gratings (FBGs), are provided within the fiber 40. Generally, the fiber length corresponds to a maximum target distance that can be simulated, e.g., a maximum target simulation distance.

Depending on the frequency shift introduced by the first optical modulator 36, the modulated optical signal is reflected by a dedicated frequency selective reflector 42 of the several frequency selective reflectors 42 located at a dedicated distance within the fiber 40, thereby introducing a certain delay in the optical signal processed.

Hence, the received optical input signal of the optical system 12 is modulated by the first optical modulator 36 on a frequency that corresponds to the operational frequency of a dedicated frequency selective reflector, namely a specific fiber Bragg grating (FBG).

The modulated optical signal was led into a long fiber with the frequency selective reflectors, namely the fiber Bragg gratings (FBGs), at specific distances. The modulated optical signal is reflected at the frequency selective reflector, namely the dedicated FBG, that corresponds with the distance to be simulated of the respective target, e.g., dependent on the modulation frequency.

Generally, the frequency selective reflectors 42 provide a reflected signal depending on the respective frequency of the optical input signal received. The reflected signal is forwarded or rather reflected back to the second circulator 38 that forwards the reflected signal into an output fiber 44. In the output fiber 44, a second optical modulator 46 is provided that is also controlled by the control and/or analysis module 28.

The second optical modulator 46 also shifts the frequency of the reflected signal depending on a controlling of the control and/or analysis module 28, thereby setting a desired response frequency of the response signal provided by the system 10, e.g., the target simulator 18. Furthermore, a Doppler shift may be introduced by the second optical modulator 46 with respect to the optical input signal provided by the optical system 12, namely the LiDAR system.

Accordingly, the delayed signal is circulated to the second optical modulator 46 that may remove the frequency modulation introduced by the first optical modulator 36, leaving back the original frequency (and optionally an intended Doppler shift).

In addition, an amplitude modifier 48, such as an amplifier, is provided in the output fiber 44 such that the amplitude of the reflected signal, namely the modulated reflected signal outputted by the second optical modulator 46, can be adjusted. The control and/or analysis module 28 also controls the amplitude modifier 48 appropriately.

Generally, a certain target scenario may be applied that relates to a distance, amplitude as well as frequency shift of the reflected signal. The control and/or analysis module 28 controls or rather drives the respective components of the system 10, namely the optical modulators 36, 46 as well as the amplitude modifier 48.

The modified reflected signal, namely the reflected signal modified in frequency and amplitude, is forwarded to the first circulator 34, which forwards the modified reflected signal to an output interface 50. The output interface 50 may also be established by a fiber coupler, for example the fiber coupler that already establishes the input interface 32.

In some embodiments, the first circulator 34 and the second circulator 38 correspond to the terminals of the output fiber 44.

Via the output interface 50, the reflected signal, namely the response with the delay introduced and/or the desired frequency and/or desired amplitude, is forwarded to the optical system 12 via the optics 33. Hence, the modulated reflected signal is amplified and sent back to the optical system 12, where it is seen as a target at a specific distance.

Accordingly, the optical system 12 outputs the optical signal received by the system 10, namely the LiDAR's radiated signal, which is a laser beam with very low divergence. The position sensor 26 senses the location and/or direction of the signal outputted, wherein the respective information provided by the position sensor 26 is processed by the control and/or analysis module 28 for controlling the system 10 appropriately, thereby ensuring that the system 10 outputs a response to the optical system 12 depending on the information received from the position sensor 26.

Besides the sensing by the position sensor 26, the signal outputted by the optical system 12 is also coupled into a fiber by the input interface 32.

After coupling to the fiber, the optical input signal is frequency shifted by the first optical modulator 36. Further realizations of the first optical modulator 36 may employ a Mach Zehnder Modulator (MZM) in order to shift the signal to the frequency range of a certain frequency selective reflector, e.g., a FBG, within the delay line. With fast frequency switching, each angle scanned by the optical system 12 experiences the desired delay.

Additionally, signal strength control allows modulating the emulated reflectivity of the target. Furthermore, the Doppler effect emulation is feasible through frequency offsets. Since electronic signals drive all modulations, fast delay changes are achievable during scanning Thus, the tested optical system 12 can experience variable scenery in real-time, which also enables resolution estimation in azimuth and elevation.

The delayed signal, namely the response or rather reflected signal, is retransmitted to the querying optical system 12 via the output interface 50.

In the output fiber 44, the amplitude modifier 48, e.g., the additional optical amplifier, may boost signal power independent of the target to compensate for insertion loss of the system 10.

Generally, retransmission is achieved with a fiber coupler-based transition to free space propagation. For this purpose, the same fiber coupler that is employed for acquisition can be reused if the retransmitted signal is coupled to the input path by the first optical circulator 34.

The diffusor in front of the fiber coupler, namely the interfaces 32, 50, guarantees a partial beam directed exactly into the incident direction. The querying optical system 12 acquires this signal and detects the emulated target due to the respective characteristics of the delayed signal or rather reflected signal. Accordingly, no signal sampling is necessary.

Figure 2:
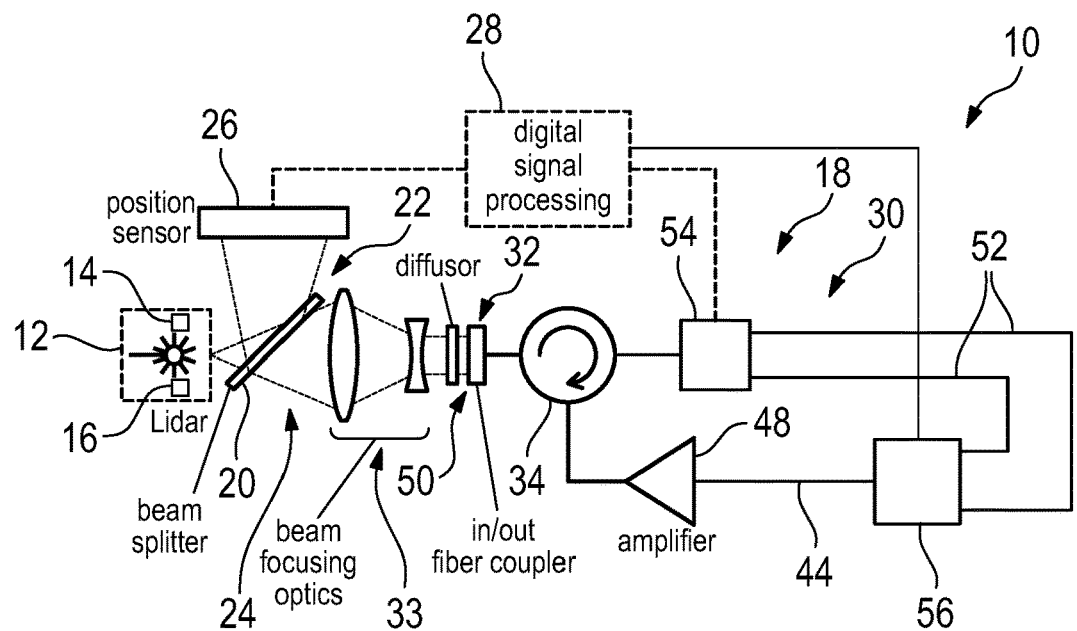
FIG. 2 schematically shows a system for creating an adjustable delay in an optical signal according to a second embodiment.

In FIG. 2, a second embodiment of the system 10 is shown that distinguishes from the one embodiment shown in FIG. 1 in that the delay is introduced by fiber delay lines 52 having different lengths. Hence, the optical signals processed by the different fiber delay lines 52 are delayed differently due to their different lengths.

In this embodiment, the system 10 comprises at least one optical switch 54 that is associated with the input interface 32. The optical switch 54 is controlled by the control and/or analysis module 28 such that a dedicated fiber delay line 52 of the at least two different fiber delay lines 52 is selected for processing the optical input signal in order to introduce the desired delay associated with the target scenario applied.

The ends of the fiber delay lines 52 facing away from the optical switch 54 are connected to another optical switch 56, e.g., a second optical switch, that feeds back the delayed optical signal into the output fiber 44 that comprises the amplitude modifier 48 as discussed above. The another optical switch 56 may also be controlled by the control and/or analysis module 28. In some embodiments, the optical switch 54 and the delay lines 52 are binary cascades.

Figure 3:
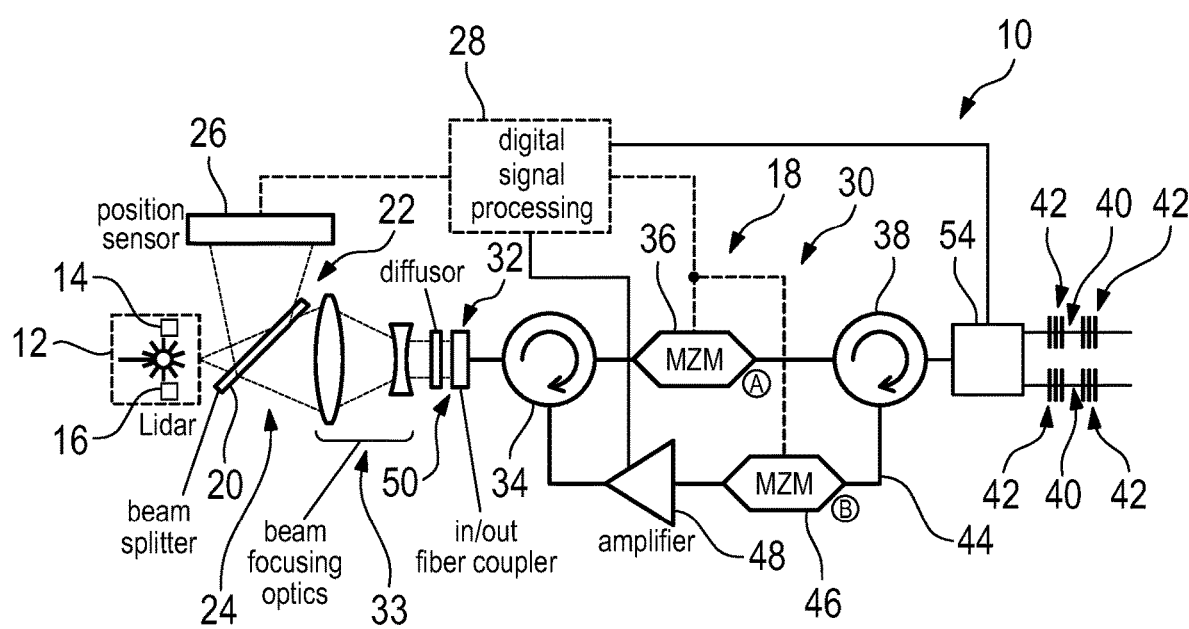
FIG. 3 schematically shows a system for creating an adjustable delay in an optical signal according to a third embodiment.

In FIG. 3, an alternative embodiment is shown that corresponds to a combination of the embodiments shown in FIG. 1 and FIG. 2. Accordingly, the embodiment shown in FIG. 3 is based on the embodiment shown in FIG. 1, wherein the second circulator 38 is not directly connected with the fiber 40, but with the first switch 54 that connects the second circulator 38 with at least two different fibers 40, e.g., fiber delay lines 52, which each are established in a similar manner to the fiber 40 shown in FIG. 1.

Hence, the fibers 40 or rather fiber delay lines 52 shown in FIG. 3 each comprise frequency selective reflectors 42, namely Fiber Bragg Gratings (FBGs) at different locations. Therefore, a coarse adjustment and a fine adjustment of the delay introduced by the system 10 are ensured.

The frequency shift introduced by the first optical modulator 36 and the setting of the first optical switch 54 that connects one of the different fibers 40 or rather fiber delay lines 52 with the second circulator 38 provide the two-step delay adjustment, namely the coarse adjustment and the fine adjustment. Accordingly, the signal delay is purely done in the optical domain.

Figure 4:
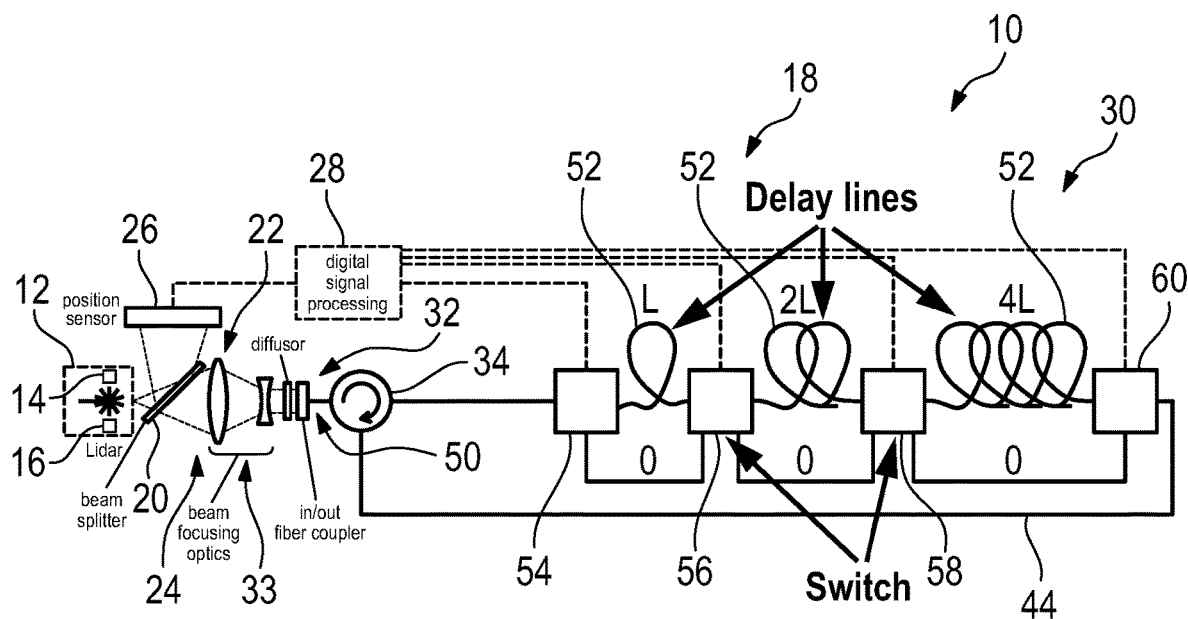
FIG. 4 schematically shows a system for creating an adjustable delay in an optical signal according to a fourth embodiment.

In FIG. 4, another embodiment of the system 10 is shown that also comprises delay lines 52 with different lengths as indicated by "L", "2L" and "4L". However, the delay lines 52 are connected in a cascaded manner. Hence, the several delay lines 52 together establish a cascaded delay line system. Hence, several optical switches 54, 56, 58, 60 are provided, wherein each optical switch 54-60 is connected with at least one of the delay lines 52.

Generally, N delay lines and N+1 optical switches are provided, as two successive delay lines 52 are interconnected with one respective switch. In addition, one switch 54 is associated with the beginning of the cascaded delay line system and one switch 60 is associated with the end of the cascaded delay line system.

The optical switches 54-60 each have two switching states, thereby establishing a switched binary cascade, as each optical switch 54-60 may be connected with another switch 54-60 directly or rather one of the delay lines 52. Depending on settings of the optical switches 54-60 of the switched binary cascade, the delay introduced can be varied in steps. The control and/or analysis module 28 may control the respective optical switches 54-60 accordingly, thereby ensuring that a certain delay is introduced.

In the shown embodiment, a delay may be introduced that may be associated with a delay length between "0L" and "7L", wherein the step size of "1L" is provided. "L" generally relates to a defined length of the delay lines 52. Thus, eight different delays can be introduced by the system 10 shown in FIG. 4 depending on the settings of the optical switches 54-60. As mentioned above, three delay lines 52 are provided, resulting in $2^3$, namely eight, different delays that can be introduced.

Figure 5:
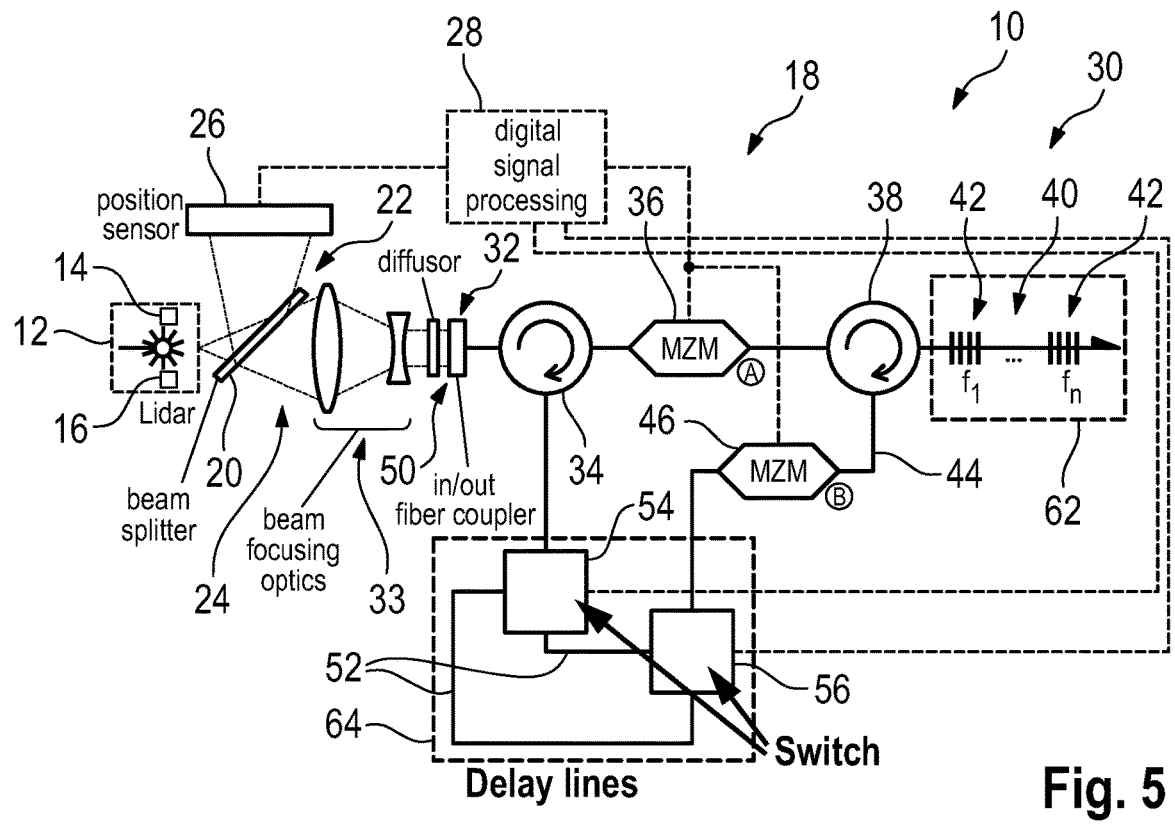
FIG. 5 schematically shows a system for creating an adjustable delay in an optical signal according to a fifth embodiment.

In FIG. 5, another embodiment of the system 10 is shown that combines the delay lines 52 with different lengths and the at least two frequency selective reflectors 42. In some embodiments, a coarse delay adjustment unit 62 and a fine delay adjustment unit 64 are provided that are connected in series.

The coarse delay adjustment unit 62 comprises the at least two frequency selective reflectors 42, e.g., the fiber 40 having the at least two frequency selective reflectors 42, for example several frequency selective reflectors 42.

The fine delay adjustment unit 62 comprises the delay lines 52 with different lengths and the optical switches 54, 56 that are controlled by the control and/or analysis module 28 such that different lengths can be set depending on the respective settings of the optical switches 54, 56.

Certain embodiments disclosed herein, for example the respective module(s), etc., utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near,"

etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for creating an adjustable delay in an optical signal for providing a response to an optical system, the system comprising:
   an input interface for receiving an optical input signal;
   a first optical modulator associated with the input interface, wherein the first optical modulator is configured to shift the frequency of the optical input signal received depending on a setting of the first optical modulator, thereby generating a modulated optical signal;
   at least two frequency selective reflectors, the at least two frequency selective reflectors being configured to reflect the modulated optical signal, thereby providing a reflected signal;
   a control circuit connected with the first optical modulator, the control circuit being configured to adapt the setting of the first optical modulator such that a frequency shift of the optical input signal introduced by the first optical modulator is set by the control circuit, the frequency shift introduced by the first optical modulator corresponding to an operational frequency of one of the at least two frequency selective reflectors associated with the setting of the first optical modulator;
   an output fiber associated with the at least two frequency selective reflectors, the output fiber receiving the reflected signal from the corresponding frequency selective reflector; and
   a second optical modulator associated with the output fiber, wherein the second optical modulator is configured to shift the frequency of the reflected signal to a desired response frequency.

2. The system according to claim 1, further comprising an output interface associated with the output fiber, the output interface receiving the reflected signal.

3. The system according to claim 1, wherein the control circuit is connected with the second optical modulator, and wherein the control circuit is configured to control the second optical modulator such that the frequency shift of the reflected signal is set by the control circuit.

4. The system according to claim 1, wherein the second optical modulator is configured to provide a Doppler shift of the reflected signal with respect to the optical input signal.

5. The system according to claim 1, wherein the control circuit comprises a signal generator that outputs a control signal used for controlling the first optical modulator.

6. The system according to claim 1, wherein the at least two frequency selective reflectors are associated with a fiber.

7. The system according to claim 1, further comprising a position sensor that is configured to determine the direction of the optical input signal.

8. The system according to claim 1, further comprising an amplitude modifier that is associated with the output fiber.

9. The system according to claim 1, further comprising a first circulator and a second circulator that define terminals of the output fiber.

10. The system according to claim 9, wherein the first optical modulator is located between the first circulator and the second circulator.

11. The system according to claim 1, further comprising at least one directional coupler associated with the output fiber.

12. The system according to claim 1, further comprising at least two fiber delay lines with different lengths, which are associated with the input interface.

13. The system according to claim 1, further comprising at least one optical switch associated with the input interface.

14. The system according to claim 13, wherein the control circuit is connected with the at least one optical switch, the control circuit being configured to adapt the setting of the optical switch.

15. The system according to claim 13, further comprising at least two fiber delay lines with different lengths, which are associated with the input interface, the at least one optical switch being associated with the at least two fiber delay lines, the at least one optical switch being configured to direct the optical input signal received at the input interface to at least one of the at least two fiber delay lines depending on a setting of the optical switch.

16. A system for creating an adjustable delay in an optical signal for providing a response to an optical system, the system comprising:
   an input interface for receiving an optical input signal;
   a first optical modulator associated with the input interface, the first optical modulator shifting the frequency of the optical input signal received depending on a setting of the first optical modulator, thereby generating a modulated optical signal;
   at least two frequency selective reflectors, the at least two frequency selective reflectors being configured to reflect the modulated optical signal, thereby providing a reflected signal;
   a control circuit connected with the first optical modulator, the control circuit being configured to adapt the setting of the first optical modulator such that a frequency shift of the optical input signal introduced by the first optical modulator is set by the control circuit, the frequency shift introduced by the first optical modulator corresponding to an operational frequency of one of the at least two frequency selective reflectors associated with the setting of the first optical modulator;
   an output fiber associated with the at least two frequency selective reflectors, the output fiber receiving the reflected signal from the corresponding frequency selective reflector; and
   a position sensor that is configured to determine the direction of the optical input signal.

17. A LiDAR target simulator for creating an adjustable delay in an optical signal for providing a response to a LiDAR system to be tested, the LiDAR target simulator comprising:

an input interface for receiving an optical input signal;

a first optical modulator associated with the input interface, the first optical modulator shifting the frequency of the optical input signal received depending on a setting of the first optical modulator, thereby generating a modulated optical signal;

at least two frequency selective reflectors, the at least two frequency selective reflectors being configured to reflect the modulated optical signal, thereby providing a reflected signal;

a control circuit connected with the first optical modulator, the control circuit being configured to adapt the setting of the first optical modulator such that a frequency shift of the optical input signal introduced by the first optical modulator is set by the control circuit, the frequency shift introduced by the first optical modulator corresponding to an operational frequency of one of the at least two frequency selective reflectors associated with the setting of the first optical modulator; and an output fiber associated with the at least two frequency selective reflectors, the output fiber receiving the reflected signal from the corresponding frequency selective reflector, wherein the LiDAR target simulator is configured to simulate a target for the LiDAR system to be tested by creating an adjustable delay in the optical signal processed by the LiDAR target simulator, thereby providing the response to the LiDAR system.

* * * * *